March 19, 1935.  C. E. ANDERSON  1,995,165
PISTON RING EXPANDER
Filed Sept. 22, 1934
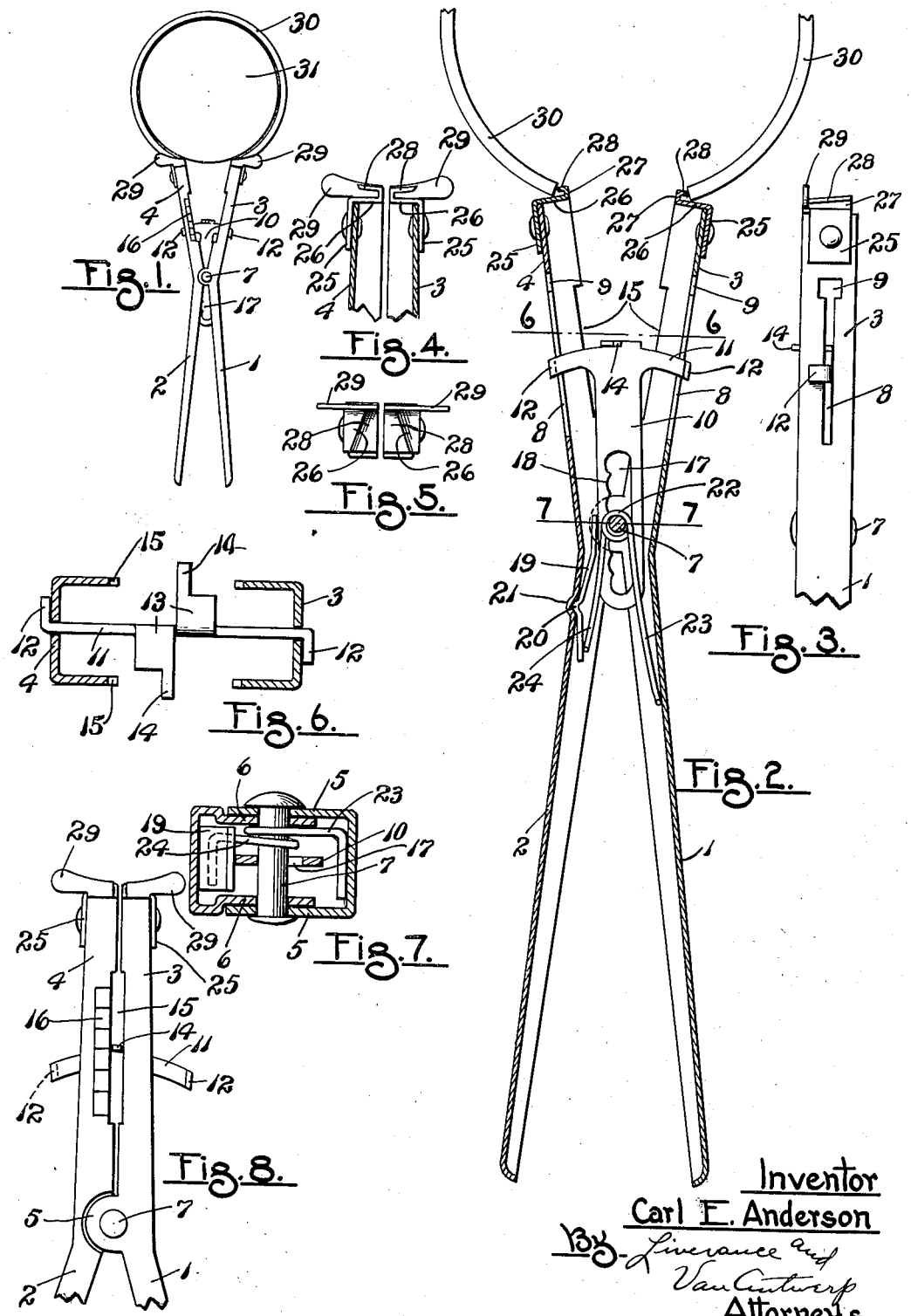
Inventor
Carl E. Anderson
By Liverance and Van Antwerp
Attorneys Patented Mar. 19, 1935

1,995,165

UNITED STATES PATENT OFFICE 1,995,165

PISTON RING EXPANDER

Carl E. Anderson, Spring Lake, Mich., assignor to Sealed Power Corporation, Muskegon, Mich., a corporation of Michigan Application September 22, 1934, Serial No. 745,064

7 Claims. (Cl. 29—86.4)

This invention relates to piston ring expanders.

Piston rings, when the same are assembled with pistons and located in the ring grooves thereof, require expanding, that is, spreading open of the ring at the parting, sufficient that the ring can pass over the upper end of the piston so as to come to a groove in which it is to be located, the ring thereupon being released and contracting to its normal size and seating in the groove.

As piston rings are almost universally, if not entirely made from cast iron, the degree that the same may be spread open is limited, particularly as the cross section of a piston ring is relatively small and it is quite easy to break or snap the ring if the same is expanded or opened beyond a certain point.

It is a primary object and purpose of the present invention to provide a relatively simple piston ring expander which may be readily adjusted so as to properly expand many different sizes of piston rings, and in every case not beyond a maximum safe spreading, and by means of which the expanded or opened ring may be very simply and easily placed over a piston and moved to the ring groove which is to receive it. In addition, the ring expander of my invention is equipped with indicating means whereby the same may be accurately and quickly adjusted for any particular size of ring which is to be expanded and placed over a piston.

An understanding of the invention for the attainment of the ends stated, as well as many others not at this time specifically enumerated, may be had from the following description, taken in connection with the accompanying drawing in which:

Fig. 1 is a plan showing the device in operation to expand a piston ring and place the same over the upper end of a piston.

Fig. 2 is a fragmentary enlarged longitudinal section through the ring expander.

Fig. 3 is a fragmentary side elevation of one jaw member of the expander.

Fig. 4 is a section and side elevation of the upper end of said expander.

Fig. 5 is a plan of the upper end of the ring expander.

Figs. 6 and 7 are transverse sections on the planes of lines 6—6 and 7—7 of Fig. 2, and Fig. 8 is an elevation of the upper end portion of the ring expander.

Like reference characters refer to like parts in the several views of the drawing.

In the construction, and as shown in Figs. 1 and 2, two members are provided made from sheet metal, preferably, and of substantially channel form in cross section, including lower handle sections 1 and 2 and upper jaw sections 3 and 4. Intermediate the ends of said members, or at the junctures of the handle portions and the jaw portions, one of the members is provided with ears 5 as an extension to the flanges of the channel shaped form from which the member is made, within which other inset ears 6, projecting from the flanges of the opposite member extend, a pivot pin 7 passing through said ears 5 and 6, as best shown in Figs. 7 and 8. The web portions of the upper ends of jaw sections 3 and 4 of the members are vertically slotted at their intermediate portions as indicated at 8, said slots being enlarged at their upper ends at 9. (Fig. 3).

A member for adjusting the device for the different sizes of piston rings which are to be spread is provided, comprising a flat plate 10, the upper end of which, as shown in Fig. 2, is formed with oppositely extending curved arms 11 which pass through the slots 8, each at its outer free end, having a stop 12 turned at right angles. The openings 9 at the upper ends of the slots 8 are of a size to permit the passage of said stops 12, but when the arms 11 enter the slots 8, the stops prevent movement of the upper jaw portions 3 and 4 away from each other more than a definite prescribed amount of which is defined by the engagement of said stops 12 with said jaw members 3 and 4 as shown.

At the upper end of the bar 10, two lips 13 are turned outwardly in opposite directions at right angles to the bar, each of which has extensions 14 which pass through an opening 15 (Fig. 8) made by cutting away adjacent edge portions of one of the flanges of each of the jaw members 3 and 4. An indicating scale 16 is provided on the flange of one of said members, as the member 4 in Fig. 8, and the part 14 operates as a pointer with reference to such scale.

The lower end of the bar 10 is vertically slotted as shown at 17. One edge of the slot is provided with a series of consecutive spaced apart concave recesses or depressions 18 in any one of which the pivot pin 7 may seat. The depression in which the piston pin seats will be dependent upon the position to which the bar 10 is vertically adjusted. A rocker member 19, made of flat metal, bears at its upper end against an edge of the bar 10. Between its ends it is formed with a transverse bead 20, seating in a transverse recess or socket 21, formed in the handle member 2

(Fig. 2). A coiled spring 22 is placed around the pivot pin 7, one arm 23 extending therefrom bearing against the inner side of the handle 1, while the other arm 24 bears against the lower end of the rocker member 19, the ends of the arms 23 and 24 of the spring being turned at right angles as shown in Fig. 7, so as to provide proper and sufficient bearing. The force of the spring tends to move the handles 1 and 2 away from each other and bring the jaw members 3 and 4 toward each other to the position shown in Fig. 8. Also, the rocker member being acted upon by the spring arm 24 at its upper end, presses the bar 10 into engagement with the pivot pin 7. When the handle members 1 and 2 are spread the effort of the spring 22 is least and in this position the rocker member 19 acts with least effort upon the bar 10 and permits said bar to be adjusted longitudinally with little resistance.

At the upper end of each jaw member 3 and 4 a ring engaging and holding member is permanently secured. Each of said members has a section 25 riveted or otherwise permanently secured to its respective jaw member 3 or 4. At the upper end said metal is bent inwardly to lie across the upper end of the jaw member to which it is attached, making a section 26, which at its inner edge is turned upwardly for a short distance, as indicated at 27, and then turned back over and parallel to the section 26 making terminal lips 28, the edges of which are inclined at an angle to the plane of the sections 25 so that when the two jaw members are together, as in Figs. 5 and 8, the adjacent edges of the terminal lips 28 diverge from each other, shown best in Fig. 5. At one side edge of each of said ring engaging members a wing 29 is turned at right angles to and from the sections 26 as shown.

These ring engaging members are hardened to resist wear. A piston ring 30 may be engaged with the edges of the lips 28 at the ring parting, as shown in Fig. 2, and the inclined edges of the lips will cause the ring to automatically move over toward the wings 29 and bear thereagainst. Then by bringing the handles 1 and 2 together the jaw members 3 and 4 are separated, spreading the ring as shown in Fig. 1 so that it may be readily passed over the upper end of a piston 31 until it comes to a ring receiving groove. Then by releasing the handles 1 and 2 the ring will contract and be received within the groove and separated from the expander. The distance that the upper ends of the jaw members 3 and 4 may be opened and spread apart is dependent upon the position of the adjustable member 10. If said member 10 is lifted to a higher position than shown in Fig. 2, the jaw members cannot be opened as far, and if adjusted to a lower position they may be opened farther. The pointers 14 movable along the edge of the scale 16 indicate to the user of the appliance where to adjust the member 10 for a selected size of ring which is to be spread and placed over a piston. The ends of the ring at its parting engage against the edges of the lips 28, and many different sizes of rings may be operated and properly spread to be placed over pistons with the one size of tool. There is a safeguard against spreading a ring too far in the stops 12 and the adjustment of the member 10 to the proper position so that danger of snapping the rings on spreading the same is guarded against.

With the construction described the handling of piston rings and the assembling of the same in the ring grooves of pistons or removing them from the grooves is very readily and easily accomplished. There is insurance against too great a spreading and breaking of the rings, and at the same time a further insurance that the ring will be spread sufficiently to pass over the piston with which it is to be assembled. The adjustable member 10 and the construction of the immediate ring engaging members permits the device to be used with many different sizes of piston rings.

The construction described is very practical and efficient and has proved exceptionally satisfactory in practice. The claims appended hereto define the invention, which is to be considered comprehensive of all forms of structure coming within their scope.

I claim:

1. A piston ring spreader comprising, two elongated members pivotally connected together between their ends to provide handles at one side of the pivot and jaw members at the opposite side, spring means tending to separate the handles and move the jaw members toward each other, a slotted bar adjustably mounted on said pivot and provided with recesses in one side of the slot in any one of which the pivot may be seated, means acted upon by said spring means for yieldingly retaining the slotted bar in any position to which it may be adjusted on said pivot, said bar at its upper end having oppositely extending arms terminating in stops located at right angles to the length of the arms, said jaw members having slots therein through which the arms extend with the stops located at the outer sides of the jaw members, and piston ring holding members connected one at the outer end of each of said jaw members.

2. In a piston ring spreader, two elongated members pivotally connected together between their ends to provide operating handles at one side of the pivot and jaw members at the opposite side, said jaw members being vertically slotted, a bar having an elongated slot therein through which the pivot passes, said slot having a plurality of recesses in a side edge thereof in which said pivot may seat, a rocker member mounted on one of said first mentioned elongated members and having one end engaged against an edge of said bar to press the same against said pivot, spring means around said pivot having parts extending therefrom, one engaging the opposite end of said rocker member and the other the opposed first mentioned elongated member, oppositely extending arms at the upper end of said bar passing through said slots in the jaw members, stops at the outer end of said arms, and a ring holding member connected at the outer end of each jaw member, as specified.

3. A construction containing the elements in combination defined in claim 2, said bar at its upper end having a laterally extending pointer projecting therefrom passing outwardly to one side of said jaw members and between the same, and a scale carried by one of said jaw members adjacent which the pointer moves as the bar is adjusted to different positions on said pivot pin.

4. A piston ring expander comprising two elongated members pivotally connected together between their ends to provide operating handles at one side of the pivot and jaw members at the opposite side thereof, a bar longitudinally adjustable upon said pivot, arms at one end of said bar extending in opposite directions, stops on the bar to engage with the jaw members and limit their extent of movement away from each other, an indicating scale on one of said jaw members, a pointer carried by said bar to move in conjunction with said scale on adjusting the bar to different positions, and piston ring holding members connected one to the outer end of each jaw member adapted to engage and hold a parted piston ring with the end portions of the piston ring at each side of the parting therein engaged by said piston ring holding members.

5. A piston ring spreader comprising, two elongated members pivotally connected together between their ends to provide handles at one side of the pivot and jaw members at the opposite side thereof whereby on bringing the handle members toward each other the jaw members are separated, and ring engaging members secured one at the outer end of each of said jaw members, said ring engaging members having lips paralleling the ends of the jaw members and extending in opposite directions from each other, the ring engaging edges of said lips converging toward one side of said jaw member.

6. A piston ring spreader comprising, two elongated members pivotally connected together between their ends to provide handles at one side of the pivot and jaw members at the opposite side thereof whereby on bringing the handle members toward each other the jaw members are separated, and ring engaging members secured one at the outer end of each jaw member, said ring engaging members being of hardened sheet metal and having lips substantially paralleling the ends of the jaw members, said lips extending in opposite directions from each other and adapted to engage the ends of a piston ring at the parting thereof.

7. A construction containing the elements in combination defined in claim 5, said ring engaging members at said side thereof toward which the ring engaging lips converge each having a stop wing against which sides of the end portions of a parted ring are adapted to bear, as and for the purposes specified.

CARL E. ANDERSON.